United States Patent [19]

Kaczorowski

[11] Patent Number: 5,187,840
[45] Date of Patent: Feb. 23, 1993

[54] CLASP WITH A TAPE FOR BINDING, FIXING, AND TIGHTENING

[76] Inventor: Wladyslaw Kaczorowski, 19-21 Menahan St., Ridgewood, N.Y. 11385

[21] Appl. No.: 617,638

[22] Filed: Nov. 26, 1990

[51] Int. Cl.⁵ .............................................. A44B 21/00
[52] U.S. Cl. .................................... 24/273; 24/68 R; 24/68 CD; 24/71 TD
[58] Field of Search ................................. 24/270–273, 24/68 CD, 68 A, 71 ST, 71 SB, 71 TD, 68 R

[56] References Cited

U.S. PATENT DOCUMENTS

| | | | |
|---|---|---|---|
| 588,268 | 8/1897 | Davis | 24/271 |
| 3,475,793 | 11/1969 | Oetiker | 24/271 X |
| 4,062,520 | 12/1977 | Patterson, III et al. | 24/271 X |
| 4,541,152 | 9/1985 | DiMarco et al. | 24/271 |
| 4,604,772 | 8/1986 | Arff | 24/68 R |

FOREIGN PATENT DOCUMENTS 2627368  2/1977  Fed. Rep. of Germany ..... 24/68 R

*Primary Examiner*—James R. Brittain

[57] ABSTRACT

A clasp device for use with a variety of securing members for fastening a selected securing member around an object. A bed plate is mounted on the object around which the securing member is to be fastened. The bed plate includes a first bed plate column and a second bed plate column mounted on opposite ends of the bed plate. A first end of the securing member is secured to the bed plate near the second bed plate column. An arm is pivotally mounted on the first bed plate column and moveable between an open and a closed position, such that in the closed position, the arm overlies the bed plate. The arm includes supporting and guiding structures for adjustably and removably mounting a clamp for the securing member allowing for variable tension on the securing member. A lever pivotally attached to the distal end of the arm moves between the open and closed position. The clasp may be locked in a closed position.

17 Claims, 2 Drawing Sheets

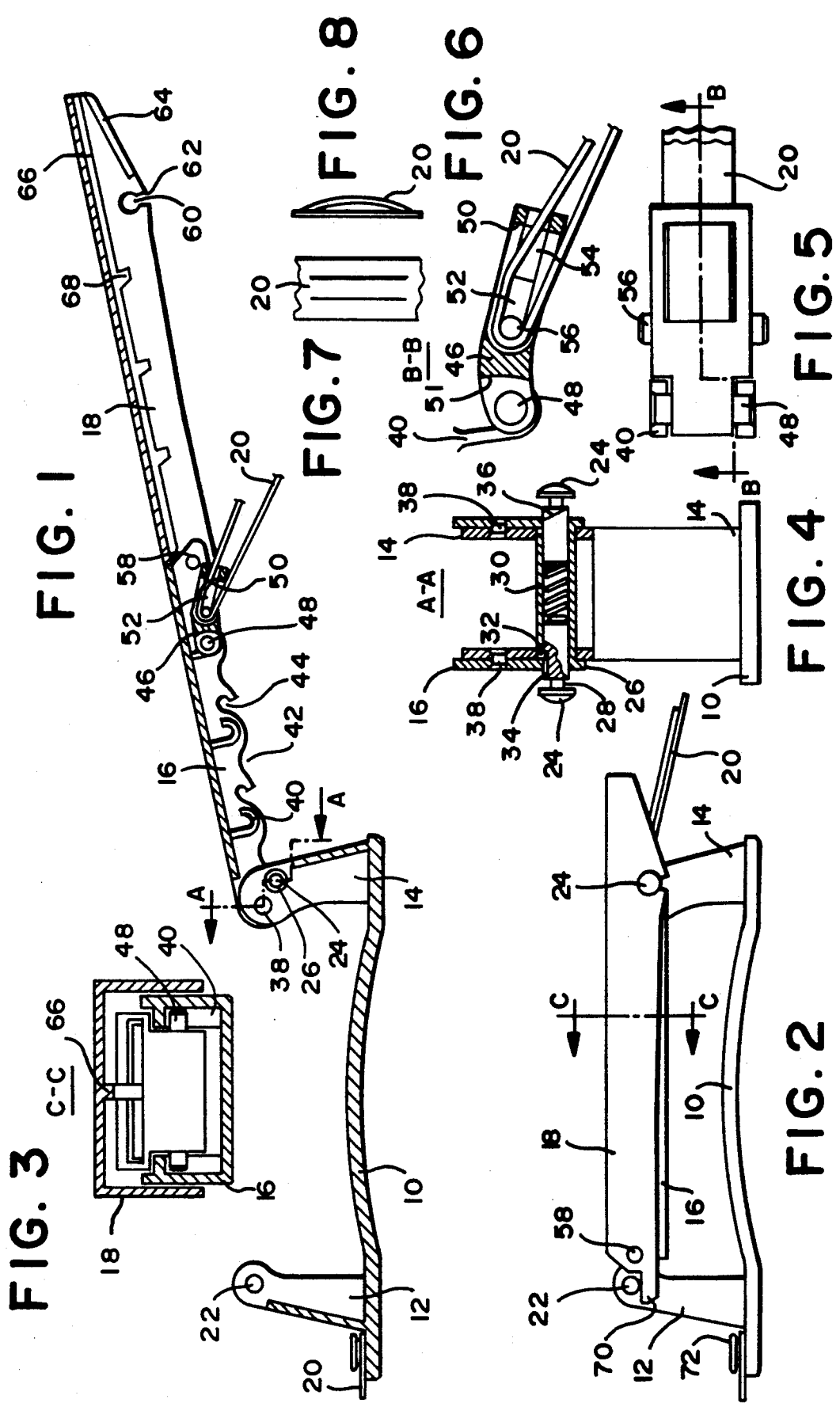

CLASP WITH A TAPE FOR BINDING, FIXING, AND TIGHTENING

FIELD OF THE INVENTION

This invention relates to a device for fastening, fixing, or binding a securing member about a variety of goods of different shapes and dimensions. It especially relates to a device allowing universal, practical, and effective use for closing or securing goods such as suitcases, luggage-carriers, or in case of damage of luggage or goods during transportation.

BACKGROUND OF THE INVENTION

A variety of devices exist for fastening a securing member about packs, boxes, etc. Those devices, used while preparing goods for transportation, are typically steel or plastic tape. Special devices are used for the purpose of tightening such a securing member. Often these special devices are structures fixed to a means of transportation and are of no use for general purposes.

No general purpose solutions to this problem exist. Rope, wire, or electrical cable are generally used, for example, stores frequently provide rope to customers to fasten merchandise on top of their cars.

SUMMARY OF THE INVENTION

The present invention solves the problems existing in the prior art, by providing a clasp means for use with a variety of securing members for many different purposes. The present invention allows to ensure strong or light binding, fastening and preparing the luggage o merchandise for transportation.

Another object of the present invention is to provide a clasp of simple construction for universal utility consisting of a few pieces made of common materials, such as steel, which makes the cost of production very low, implying mass production.

A further object of the present invention is to provide a clasp which is simple, easy to use and reliable.

A still further object of the present invention is to provide a clasp which connects the two endings of a securing member, with strength which can be regulated upon needs and desires because the securing member can be stopped and locked at any of a variety of positions along the clasp's arm.

The present invention achieves the above objects, providing a clasp means for use with a variety of securing members for fastening a selected securing member around an object. The clasp is made of a bed plate mounted on the object around which the securing member is to be fastened. The bed plate includes a first bed plate column and a second bed plate column mounted on opposite ends of the bed plate. A first end of the securing member is secured to the bed plate near the second bed plate column. An arm is pivotally mounted on the first bed plate column and moveable between an open and a closed position, such that in the closed position, the arm overlies the bed plate. The arm includes supporting and guiding structures for adjustably and removably mounting a clamp for the securing member allowing for variable tension on the securing member. A lever, pivotally attached to the distal end of the arm moves between said open and closed position. The clasp may be locked in a closed position.

BRIEF DESCRIPTION OF THE DRAWINGS

FIG. 1 represents a longitudinal cross section of the clasp in an opened, unclasped position.

FIG. 2 represents a longitudinal cross section of the clasp in a closed position.

FIG. 3 represents a longitudinal cross section of the clasp in a closed position taken along line C—C of FIG. 2.

FIG. 4 represents a cross sectional view of the clasp in a closed position taken along line A—A in FIG. 1.

FIG. 5 represents an overhead view of the clamp of the present invention.

FIG. 6 represents a longitudinal cross section of the clamp along line B—B in FIG. 5.

FIG. 7 represents one example of a securing member for use with the present invention.

FIG. 8 represents a side view of the securing member of FIG. 7.

DETAILED DESCRIPTION OF THE PREFERRED EMBODIMENTS

Figure 9:
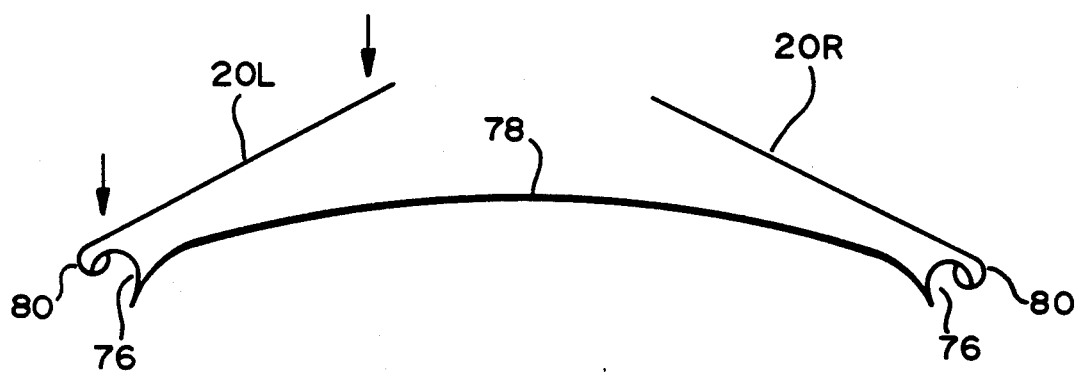
FIG. 9 represents a view of the application of the clasp means for securing articles to the top of a car.

FIG. 1 shows one embodiment of the present invention clasp means in an opened position. The clasp means may be made of a suitably stiff material such as, for example, steel. The embodiment of the present invention shown in FIG. 1 includes a bed plate 10. The securing member 20, to be secured around, for example, a box or luggage, is attached at one end to the bed plate by, for example, a rivet 72 or similar means. First and second bed plate columns 12 and 14 protrude from the surface of the bed plate 10. The first bed plate column 12, is provided with a blocking bolt 22. The second bed plate 14 column provides a point of attachment for an arm 16.

The arm 16 is pivotally attached at one end to the second bed plate column 14 by the arm rivet axle 38. On the surface of the arm 16 are provided a plurality of bearing and guiding surfaces 40. These bearing and guiding surfaces support clamp means 46 for tightening and clamping the securing member 20. Adjacent to the bearing and guiding members, away from the point of attachment of the arm 16 to the second bed plate column, are a second arm profile 44 and then a first arm profile 42.

The bearing and guiding surfaces 40 act as a point of attachment for the securing member clamp 46 by means of a clamp pivot 48, the detail of which is shown in FIG. 6. The clamp includes a profile 51 in which the bearing and guiding surfaces 40 move and to prevent the clamp means 46 from getting out of the bearing and guiding surfaces 40 when the clamp is in a closed position. The clamp means has an entry passage 57 through which the securing member 20 passes. The edge 50 of the entry opening acts as a tightening edge of the clamp means 46. The securing member tightener pivot 56, with the attached tightening surface 52 has ends which extend into and through the slideway 54 formed in the sides of the clamp means 46 as seen in FIG. 5. An exit opening 59 formed in the surface of the clamp facing the arm 16 in the closed position allows the securing member to exit the clamp means 46. A similar opening is formed on the opposite side of the clamp means 46. FIGS. 5 and 6 show the clamp means 46 resting in the bearing and guiding members 40. The multiple bearing and guiding members allow the present invention to achieve a versatility unknown in prior art clasps.

A lever 18 is pivotally connected to the arm 16 at its free end. A stiffening slat 66 is formed on the surface of the lever 18 facing the arm with the clasp means in the closed position. A plurality of protrusions 68 formed on the edges of the stiffening slat 66 engage the surface of the securing member 20.

Locking means for the present invention clasp means is provided by bolt holes 60 and lever cuts 62 formed in the end of the lever 18.

To lock the clasp in a closed position, near the top of the second column are two blocking bolts 24 placed within a bolt sleeve 26. Leading channels 34 protrude out around the bolt passage. Bolt limiters 32 around the opening of the bolt passage prevent blocking bolts 24, from moving too far within the passage. The blocking bolts 24 are joined to each other with a blocking bolt spring 30. This spring also allows the bolts to move as described below in the operation of the present invention. The necks of the blocking bolts 28 will lock the lever 18 in place by passing through the blocking bolt holes 60 as described below.

The free end of the lever is provided with an inclined surface 64 which acts as a surface to which pressure is applied to move the clasp means into the closed position.

Near the end of the lever 18 which is connected to the arm 16, a lip 70 is formed to provide additional locking mechanism for the present invention, the operation of which will be described below in detail.

Figure 10:
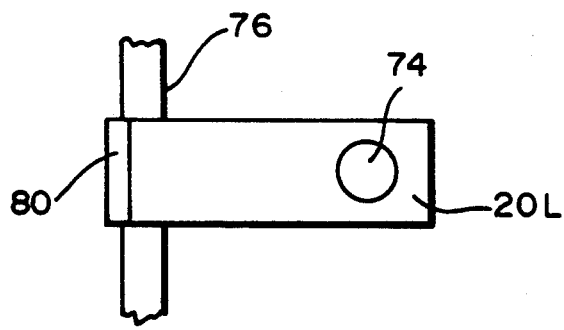
FIG. 10 represents a side view of FIG. 9.

FIGS. 7 and 8 show the tape 20, one embodiment of the securing member, with cuts along the midle line. FIG. 9 shows the clasp means and securing member at work on the roof of a car. FIG. 10 shows a side view of the application of the clasp means seen in FIG. 9.

In an alternative embodiment, which is not preferable, the profiles 42 and 44 in the arm 16 are eliminated as well as the profile 51 of the clamp means 46 from the pivots 56 of the tightener 52, thereby the eliminating the initial tension on the securing member. However, such change would cause a lesser universality of use.

OPERATION OF THE CLASP MEANS

The present invention clasp in the opened position is to be put on the merchandise that is to be secured with the securing member 20. One end of the securing member is attached to the bedplate 10 with rivet 72. The free end of the securing member 20 is shown entering the clamp 46 through the entry opening 57, girding the tightener 52, wrapping around the pivot 56, and exiting the clamp through the exit opening 59.

By means of a pivot axle 48 the clamp 46 hangs in one of the bearing and guiding surfaces 40. Simultaneously, pivot 56 is situated in the profile 44. Pulling the end of the securing member 20 makes the initial tension in the securing member 20.

By applying pressure to the inclined surface 64 at the edge of the lever 18, this lever, with the arm 16, is moved into the closed position. Simultaneously, the tightener 52 is caused to move out of the profile 44, by the tension from the securing member as the arm 16 moves into the closed position. Then, as the clasp means is moved into the closed position the securing member's tension causes the movement of the pivot axle 56 with the attached tightener 52 in the slideway 54 consequently clamping the securing member between the tightener 52 and the tightening edge 50. The tightener pivot sits in the first arm profile with the clasp means in a closed position and the first tightening edge moves into the second arm profile.

The present invention is analogous to car safety belts, but differs in the shape and construction of the clamp and the use of clamp's and tightener's pivots.

To simplify the construction process of the present invention, adjustment of the tape's initial tension may be eliminated, removing the need for the profiles 42 and 44 and tightener's pivots on the arm 16.

After the arm 16 is moved into the closed position, the securing member, for example, a tape, will be underneath the arm's point of attachment to the bed plate column, thus giving a clamping moment. After creating this moment, it is possible to begin the rotation of the lever 18 in the opposite direction into the closed position. The clamp's locking is based on the fact that the lever 18 with its cuts 62 goes to the neck 28 of the bolts 24. Pressure is applied to the bolts, sliding the bolts into the sleeve 26 as the spring 30 is compressed When the lever is moved into the fully closed position, the dowel holes 60 of a bit bigger diameter then the bolts 24, are at the same level as the bolts, and the bolts are released with the spring making the bolts pass through the dowel holes locking the clasp means. The bolts movement from the sleeve 26 is controlled by the limiters 32. Accidental unlocking of the clasp means is highly unlikely because it would require an accidental application of force to both bolts simultaneously.

The clamp means is further secured by the lever 18, which, while rotating in the above defined opposite direction, causes a locking lip 70 to move under the pin 22. This locking mechanism also makes it possible to use the clasp itself as a handle.

What is claimed is:

1. A clasp means for use with a variety of securing members for fastening a selected securing member around an object comprising:

a bed plate to be mounted on a surface of the object around which the securing member is to be fastened, the bed plate including a first bed plate column and a second bed plate column mounted on opposite ends of said bed plate and means for securing a first end of the securing member to the bed plate;

an arm pivotally mounted on said first bed plate column and moveable between an open and a closed position, such that in the closed position, said arm overlies the bed plate;

said arm including, a plurality of supporting and guiding means spaced apart along said arm for adjustably and removably mounting thereon means for tightening and clamping the opposite end of the securing member at a selected position along said arm to thereby adjust tension of the tightening of said securing member;

said arms also including, near the end most distal from the point of attachment of said arm to the first bed plate column, means for pivotally attaching a lever for actuating said arm between said open and closed position; and means for maintaining the clasp means in a closed position.

2. The clasp means according to claim 1 wherein said supporting and guiding means comprises a plurality of substantially hook shaped members extending from a surface of said arm and including a curved bearing surface upon which a pivot axle of said clamping and tightening means moves.

3. The clasp means according to claim 1 wherein, when in the closed position, the clasp means acts as a handle to carry the object around which the securing member is secured.

4. The clasp means according to claim 1 wherein the means to maintain said clasp means in a closed position comprises a lever dowel hole and a lever cut formed in the lever; two blocking bolts having a neck and a scarf, said blocking bolts being connected by a blocking bolt spring and being placed within a blocking bolt sleeve placed within a blocking bolt passage formed in the first bed plate column; the inward movement of said blocking bolts being controlled by blocking bolt limiters placed around the openings to the blocking bolt passage; said clasp means being secured by the compression of the spring allowing the blocking bolts to move inward and the lever arm to move into a position substantially parallel to the bed plate, upon said lever arm attaining said position, said bolts being released, thereby passing through said dowel holes to engage the surface of said dowel hole.

5. The clasp means according to claim 1 wherein the means to maintain the clasp means in a closed position comprises a second bed plate blocking pin on said second bed plate column and a lip extending from the end of said lever near the end where said lever is attached to said arm, said lip extending under said second column blocking pin when the clasp means is in a closed position.

6. The clasp means according to claim 1 wherein the clasp means, when in the closed position may be used as a handle for carrying the article about which the securing member is tightened.

7. The clasp means according to claim 1 wherein said supporting and guiding means which adjusts the length of said arm and the tension of the securing member includes bearing surfaces upon which said means for tightening and clamping the opposite end of the securing member; said means for tightening and clamping including an entry passage into which the opposite end of the securing member is passed, a first tightening edge on the top edge of said entry passage which engages the surface of the securing member as the clasp means is moved into a closed position, a clamp tightener pivot movably mounted in a slideway around which the securing member is placed, a second tightening edge attached to a side of said clamp tightener pivot to engage the surface of the securing member as the clasp means is moved to a closed position; an exit passage through which the securing member exits the securing member clamping means, and a clamp pivot axle mounted on said supporting and guiding means and running on the bearing surface as the clasp means is moved to a closed position.

8. A clasp means for use with a variety of securing members for fastening a selected securing member around an object comprising:
a bed plate to be mounted on a surface of the object around which the securing member is to be fastened, the bed plate including a first bed plate column and a second bed plate column, said bed plate columns extending from opposite ends of said bed plate and means for securing a first end of the securing member to the bed plate;
an arm pivotally attached to said first bed plate column and moveable between an open and a closed position, such that in the closed position, said arm overlies the bed plate;
said arm including, mounted along the length thereof, a plurality of supporting and guiding means for adjustably and removably mounting thereon means for clamping the securing member at various locations along the arm, said guiding and supporting means allowing for the adjustment of the length of the arm and therefore the tightness of the securing member, said supporting and guiding means including bearing surfaces upon which said means for clamping the securing member moves; said means for clamping the securing member including an entry passage into which the second end of said securing member is passed, a first tightening edge in said entry passage which engages the surface of the securing member as the clasp means is moved into a closed position, a clamp tightener pivot movably mounted in a slideway around which the securing member is placed, a second tightening edge attached to a side of said clamp tightener pivot to engage the surface of the securing member as the clasp means is moved to a closed position; an exit passage through which the securing member leaves the means for clamping the securing member, and a clamp pivot axle mounted on said supporting and guiding means and running on the bearing surface as the clasp means is moved to a closed position; and
means for locking the clasp means in a closed position.

9. The clasp means according to claim 8 wherein said supporting and guiding means comprises a plurality of substantially hook shaped members extending from a surface of said arm.

10. The clasp means according to claim 8 wherein, when in the closed position, the clasp means acts as a handle to carry the object around which the securing member is secured.

11. The clasp means according to claim 8 further including a lever and means for pivotally attaching said lever to said arm, near the end most distal from the point of attachment of said arm to the first bed plate column, for actuating said arm between said open and closed position and wherein;
said means for locking the clasp means in a closed position comprises a lever dowel hole and a lever cut formed in the lever; two blocking bolts having a neck and a scarf, said blocking bolts being connected by a blocking bolt spring and being placed within a blocking bolt sleeve placed within a blocking bolt passage formed in the first bed plate column; blocking bolt limiters placed around the openings to the blocking bolt passage to control the inward movement of said blocking bolts;
said clasp means being secured by the compression of the spring with the subsequent inward movement of the blocking bolts, the movement of the lever arm into a position substantially parallel to the bed plate, and the release of the spring; said bolts thereby passing through said dowel holes to engage the surface of said dowel hole.

12. The clasp means according to claim 11 wherein said lever includes an inclined surface, said inclined surface being located near the most distal end of said lever, thereby providing a large unbroken surface for the application of force to facilitate closing the clasp means.

13. The clasp means according to claim 11 wherein said lever includes a stiffening slat formed on the surface of said lever which faces the arm when the clasp means is in the closed position, said slat running substantially along the length of the lever and having a plurality of protrusions extending toward the arm and engaging the surface of the securing member when the clasp means is in the closed position.

14. The clasp means according to claim 8 wherein the means for locking the clasp means in a closed position comprises a second bed plate blocking pin on said second bed plate column and a lip extending from the end of said lever attached to said arm, said lip extending under said second column blocking pin when the clasp means is moved to a closed position.

15. The clasp means according to claim 8 wherein the clasp means, when in the closed position may be used as a handle for carrying the article about which the securing member is tightened.

16. The clasp means according to claim 8 wherein said arm includes, near the end most distal from the point of attachment to the first bed plate column, means for pivotally attaching a lever.

17. A clasp means for use with a variety of securing members for fastening a selected securing member around an object comprising:
 a bed plate to be mounted on a surface of the object around which the securing member is to be fastened, the bed plate including at least a first bed plate column mounted on said bed plate and means for securing a first end of the securing member to the bed plate;
 an arm pivotally mounted on said first bed plate column and moveable between an open and a closed position, such that in the closed position, said arm overlies the bed plate;
 said arm including a plurality of supporting and connecting means spaced apart along said arm for adjustably and removably mounting thereon means for tightening and clamping the opposite end of the securing member at a selected position along said arm to thereby adjust tension of said securing member;
 said arm also including, near the end most distal from the point of attachment of said arm to the first bed plate column, means for pivotally attaching a lever for actuating said arm between said open and closed position; and
 means for maintaining the clasp means in a closed position.

* * * * *